United States Patent [19]

Stauffer et al.

[11] Patent Number: 5,300,136
[45] Date of Patent: Apr. 5, 1994

[54] POTASSIUM FERTILIZER FROM ALUMINUM RECLAMATION BY-PRODUCTS

[75] Inventors: William O. Stauffer, Moraga, Calif.; F. Robert Hubbard, Knoxville, Tenn.

[73] Assignee: Imco Recycling, Inc., Irving, Tex.

[21] Appl. No.: 908,714

[22] Filed: Jul. 2, 1992

Related U.S. Application Data

[63] Continuation-in-part of Ser. No. 744,592, Aug. 13, 1991, abandoned.

[51] Int. Cl.$^5$ .......................... C05D 1/02; C22B 21/00
[52] U.S. Cl. ............................................. 71/31; 71/34; 71/41; 423/305; 75/303; 75/315; 75/585; 75/687
[58] Field of Search .................. 71/31, 61, 63, 25, 34; 423/305; 75/687, 585, 315, 303

[56] References Cited

U.S. PATENT DOCUMENTS

| | | | |
|---|---|---|---|
| 3,769,001 | 10/1973 | Valdo | 75/68 R |
| 3,846,123 | 11/1974 | Racunas | 75/68 R |
| 4,337,929 | 7/1982 | Evans | 266/248 |
| 4,475,940 | 10/1984 | Yung | 71/34 |
| 4,486,228 | 12/1984 | Ormesher | 75/65 R |
| 4,501,614 | 2/1985 | Bauer | 75/257 |
| 4,518,424 | 5/1985 | Ormesher | 75/65 R |
| 4,568,430 | 2/1986 | Viré | 204/67 |
| 4,927,459 | 5/1990 | Gardner | 75/685 |

FOREIGN PATENT DOCUMENTS 640195 7/1950 United Kingdom .

OTHER PUBLICATIONS

William, M., "Recovery of Values from Metal Skim and Potlinings", *TMS Paper Selection*, Paper No. A72-64, The Metallurgical Society of AIME, New York, N.Y., 1972.

Makhlyankin, I. B., et al., "Processing high-alumina potassium ores into mixed potassium salt", *Chemical Abstracts*, vol. 96, No. 121, May 24, 1982, Columbus, Ohio, US, abstract No. 180137p.

*Primary Examiner*—Ferris Lander
*Attorney, Agent, or Firm*—Townsend and Townsend Khourie and Crew

[57] ABSTRACT

Scrap aluminum is reclaimed by a salt flux-based reclamation process using potassium chloride in place of the commonly used sodium chloride. The spent flux which remains after the recovery of the aluminum is useful as a soil fertilizer, with the potassium content of the flux serving as a source of potassium nutrient for the soil. The potassium in the spent flux is highly water soluble at all values of pH while the aluminum in the spent flux remains at a limited solubility, particularly under the conditions expected to be encountered in soil. Thus, despite the known phytotoxicity of aluminum and the presence of aluminum in the spent flux, the spent flux is discovered to be useful as a plant fertilizer with the maximum benefit from the potassium and minimal if any harm from the aluminum.

23 Claims, No Drawings

POTASSIUM FERTILIZER FROM ALUMINUM RECLAMATION BY-PRODUCTS

CROSS-REFERENCE TO RELATED APPLICATION

This application is a continuation-in-part of copending application Ser. No. 07/744,592, filed Aug. 13, 1991 and now abandoned.

This invention lies in the technology of aluminum reclamation, and offers a unique combination of this technology with the technology of soil fertilization.

BACKGROUND OF THE INVENTION

With the continuing and ever-increasing interest in the recycling of materials from consumer and industrial waste, the secondary aluminum industry continues to be viewed as an important and significant means of preserving and obtaining maximum benefit from a valuable natural resource. The secondary aluminum industry uses a variety of methods and technologies to recover usable aluminum metal from various types of aluminum scrap and other aluminum-bearing waste materials.

One such method is the melting of the aluminum in the waste material while the material is in contact with a molten salt flux. The salt is either 100% NaCl or NaCl and up to 60% KCl. The preference for NaCl may be attributed to its lower cost, and the inclusion of KCl is a means of lowering the melting temperature of the flux. In either case, with sufficient agitation and a sufficiently fluid flux, the molten salt wets the impurities in the waste material and in so doing causes the aluminum to separate from both the flux and the impurities originally present in the aluminum. The flux also protects the melted aluminum, preventing it from becoming oxidized in the furnace itself. The separated aluminum forms droplets which coalesce to form a liquid aluminum pool beneath the molten salt, and this pool is readily drawn off as highly pure aluminum suitable for use in aluminum sheet mills, for the preparation of alloys, and all other types of aluminum processing.

The remaining flux together with the impurities retained with it are typically disposed of in landfills or dumps in a manner which conforms with environmental standards. The potential for environmental contamination remains, however, since NaCl may contaminate aquifers and water tables. A further concern is that the number of appropriate disposal sites is diminishing, and the cost of the use of these sites continues to increase.

These and other problems are addressed by the present invention, which provides a modification of the flux in a manner which produces spent flux which is not only safely disposable but also useful in an environmentally acceptable manner.

SUMMARY OF THE INVENTION

In accordance with this invention, the NaCl normally used in the flux is replaced with KCl, the KCl serving as the major component of the flux. In preferred embodiments, KCl is used to the exclusion of NaCl, although other salts which are either insoluble in water or environmentally acceptable may also be included. In either case, once the flux has been used to extract impurities from the aluminum, the spent flux (or "dross") is useful as a soil fertilizer, with the potassium content of the flux serving as a source of potassium nutrient for the soil. Part of the discovery underlying the present invention is that the procedural steps involved in the extraction of impurities from the aluminum can be performed in the absence of phosphoric acid or any other phosphorus compounds. In preferred embodiments of its use as a fertilizer, the spent flux is comminuted to an appropriate particle size, and, when it is desirable to do so, combined with conventional carriers, adjuvants, diluents, or other additives typically included in fertilizers.

An unusual aspect of this invention, neither predictable from nor obvious in view of the known qualities and characteristics of the materials involved, is the discovery that the potassium in the spent flux is highly water soluble at all pH's while the aluminum in the spent flux is not. Whereas aluminum is normally expected to increase in solubility as the pH is lowered, it is surprising to find that the aluminum in the form in which it exists in the spent flux has essentially zero solubility at pH values above 6.0, and remains at a limited solubility even under extremely acidic conditions, well below any levels which would give rise to phytotoxic effects in the soil. Thus, despite aluminum's known harmful effect on certain plants and its presence in the spent flux of the present invention, the spent flux is useful as a plant fertilizer with the maximum benefit from the potassium and minimal if any effect from the aluminum.

A further unusual and surprising aspect of the invention is that salts which are normally unsuitable for inclusion in soil fertilizers can now be present due to their inclusion in the flux without causing the harm they would otherwise cause. These salts are water-soluble metallic chlorides which, upon encountering soil moisture, form HCl which is harmful to plant life. In the present invention, however, these salts are accompanied by nitrogen which appears in the spent flux as nitrides. When in contact with soil moisture, the nitrogen in these compounds is converted to a form in which is it useful as fertilizing nitrogen, and the degree to which this occurs is surprisingly sufficient to neutralize the HCl enough to eliminate the potential for harm.

The present invention thus resides in the new fertilizer, as well as in methods for preparing a fertilizer from aluminum scrap, methods for fertilizing soil using spent flux from aluminum reclamation, and other means of implementing the concepts and discoveries described above. Further embodiments and features of the invention will be apparent from the description which follows.

DETAILED DESCRIPTION OF THE INVENTION AND PREFERRED EMBODIMENTS

In accordance with this invention, KCl serves as a substitute for NaCl and may entirely replace NaCl in the flux. The invention also extends however to fluxes which contain a minor amount of NaCl, provided that sufficient KCl is present to serve effectively as a plant nutrient when the spent flux is subsequently applied to soil, and that the level of NaCl is low enough to avoid any substantial harm to the soil. In general, for salt mixtures where both NaCl and KCl are present, preferred mixtures are those in which the KCl comprises at least about 90% of the total of NaCl and KCl on a weight basis, and most preferably at least about 95%.

Other salts and other materials may also be included in the flux, in accordance with their inclusion in conventional fluxes. These materials are preferably insoluble materials or materials whose placement in soil is not objectionable from environmental considerations. Cryolite and other natural minerals are examples of such a material.

Aluminum-bearing materials which have been treated by the flux prior to its use as a fertilizer in accordance with the present invention may include a wide range of aluminum-bearing waste material or scrap from a variety of sources, including both industrial waste and consumer waste. Examples of industrial waste are sheet mill scrap such as scalping chips from rolling or cladding operations, and melting furnace waste such as lumps, dross or slag. Prime examples of consumer waste are used beverage cans. Scrap of any kind will frequently include additional materials such as dirt, grit, furnace and plant floor sweepings and dust, and miscellaneous foreign objects. To facilitate the reclamation process, the scrap may be prepared prior to placement in the furnace in a variety of ways, such as for example by preheating or solvent treatment to remove printing inks and coatings if appropriate, and size reduction or shredding to accelerate melting.

The reclamation process in which the flux is initially used is generally conducted in a vessel which provides for heating and mixing of the materials in the molten state, and which permits the molten aluminum to settle out as a separate phase underneath the flux and to be drawn off without mixing of the phases. Process equipment and operating conditions for the use of conventional NaCl or NaCl/KCl flux in this manner are known in the art and are suitable for use in the present invention as well. Heating may occur directly inside the reclamation vessel or in a preheating vessel, by gas-fired or oil-fired burners or by induction or resistance heaters. Mixing may occur by agitators or stirrers or by rotation of the vessel itself. The operation may be done on a batchwise or continuous basis.

A variety of different types of furnaces may be used. Examples are reverbatory furnaces, rotary furnaces, sweat furnaces and side bay melter furnaces. A rotary barrel furnace is depicted by Evans, et al., in U.S. Pat. No. 4,337,929, issued Jul. 6, 1982. The typical furnace has a capacity of between 3,000 and 25,000 pounds, depending upon the installation site, gas and oil availability, and other considerations, and will be properly housed and connected to effluent collection and exhaust systems that meet environmental requirements.

Operating conditions typically used in conventional reclamation processes with a NaCl or NaCl/KCl flux may be used here as well. The temperature of the operation may vary, depending on the materials used, their relative amounts, the form in which they are supplied, and the degrees of contamination. The temperature may in fact be lower than that used in conventional processes using NaCl only, due to the lower melting point of KCl, but higher than that used in conventional processes where a mixture of NaCl and KCl is used, due to the eutectic effect of the combination. In most applications, best results are obtained at temperatures ranging from about 1000° F. to about 1700° F. (538° C. to 927° C.), preferably about 1200° F. to about 1600° F. (649° C. to 871° C.), and most preferably about 1300° F. to about 1500° F. (704° C. to 816° C.).

The contact time of the materials at the operating temperature may also vary, depending on many of the same factors. The contact time should be sufficient to achieve complete melting of those ingredients which will melt at the operating temperature, and to permit the full separation of any aluminum to be reclaimed. In typical operations, the contact time will fall between about ten minutes and about one hour per batch.

During the reclamation process, viscosity reductions in the flux are preferably minimized or avoided since they tend to cause suspended particles to agglomerate. This effect is commonly referred to in the industry as "drying" or "drying out," and is readily detectable by observation. If drying does occur, the process can still be continued, although there may be a reduction in the yield or efficiency of the reclamation. In any event, drying is readily eliminated or avoided by using an appropriate flux to scrap ratio, charging additional salt to the flux when needed, selecting and controlling other operating conditions, and by other methods well known among those skilled in the art.

The reclamation process may be conducted in a variety of ways. In batch processes, for instance, a single flux charge may be used repeatedly in sequence without removal of the contaminants. Thus, a single flux charge may be used with several scrap charges.

In a typical operation, a refractory-lined barrel equipped with a natural gas and/or propane burner is charged with aluminum scrap (such as sheet metal skim or used aluminum beverage containers) and the KCl salt flux. Upon completion of the process, the spent flux appears as black dross, which includes the potassium chloride and such components as alumina, aluminum chloride, silica, aluminum nitride, aluminum carbide and inerts, which were impurities in the aluminum scrap. This black dross is removed from the furnace and processed further for use as soil fertilizer. The aluminum which has settled out to the furnace bottom is separately removed and transferred to aluminum sheet mills, or to some other use as a raw material.

Included among the components of the black dross along with the original flux materials, therefore, is aluminum, which is generally in the form of alumina, aluminum chloride, and metallic aluminum which failed to coalesce with the liquid aluminum phase. As indicated above, aluminum is generally phytotoxic, but its inclusion in the resulting solids mixture according to this invention is not detrimental to the utility of the mixture as a soil fertilizer since the aluminum as it occurs in this mixture has a low water solubility. This is one of the unique characteristics of the mixture. Accordingly, there is no need to separate the KCl from the aluminum in the mixture prior to use of the mixture as a soil fertilizer.

The dross also contains further metals which have value as micronutrients or secondary nutrients. These include magnesium, copper, manganese and zinc. As further indicated above, the nitrogen content of aluminum nitride slowly converts to ammonia, which is also a valuable plant nutrient in addition to its value in neutralizing any acid generated by the hydrolysis of chloride salts.

The following examples are offered for purposes of illustration, and are intended neither to limit nor to define the scope of the invention in any manner.

EXAMPLE 1

This example illustrates a typical application of the present invention to the reclamation of aluminum from used beverage cans (UBC), with KCl as a total replacement for NaCl in the salt flux.

A gas-fired rotary barrel furnace with a capacity of 15,000 pounds is used, with the following materials:

| Aluminum scrap metal (UBC): | |
|---|---|
| shredded can bodies: | 3004 aluminum, 0.25–1.5 inch (0.6–3.8 cm) in length and width, 0.0045–0.011 inch (0.011–0.03 cm) in thickness |
| shredded can tops: | 5042/5182 aluminum, 0.25–1.5 inch (0.6–3.8 cm) in length and width, 0.010–0.013 inch (0.025–0.033 cm) in thickness |
| total charge: | 15,000 pounds, divided into three equal batches |
| KCl: | 3,400 pounds total, in portions for each UBC batch |

The furnace is initially cleaned with 500 pounds of KCl, then charged with a portion of the KCl flux, heated to about 100 to 200 degrees F. (55–110 degrees C.) higher than normal with an internal gas burner, and rotated for about twenty minutes. The first batch of aluminum scrap is then added, and the mixture is rotated in the furnace for about 150 minutes to mix the contents as the scrap melted. The gas burner is then shut off and withdrawn from the furnace, and the aluminum metal pool which had collected at the furnace bottom is drawn off. Subsequent batches of aluminum scrap are then added using the remaining portions of the flux, for approximately the same times and at approximately the same temperature.

The aluminum pools extracted from the furnace amount to 85.0% of the scrap metal charged for the first batch and 90.0% of the scrap metal charged for the second and third batches.

EXAMPLE 2

This example illustrates a typical application of the present invention to the reclamation of aluminum from Class I scrap. Class I scrap consists of aluminum body and skeleton scrap which has not been decorated (i.e., no printed matter has been applied) and has not been in contact with product.

The charge amounts are as follows:

| Class I Aluminum scrap: | 15,000 pounds, divided into two batches of approximately equal size |
|---|---|
| KCl: | 2,700 pounds total, in portions for each scrap batch |

The charge sequence and operating conditions are similar to those of Example 1. In this case, the combined aluminum pools amount to 94.5% of the scrap metal charged.

EXAMPLE 3

This example illustrates a typical application of the invention to Class III aluminum scrap. Class III scrap also consists of aluminum body and skeleton scrap which has been decorated (printed matter applied) but has not been in contact with product.

The charge amounts are as follows:

| Class III Aluminum scrap: | 30,000 pounds, divided into three batches of approximately equal size |
|---|---|
| KCl: | 2,800 pounds total, in portions for each scrap batch |

The charge sequence and operating conditions are similar to those of Example 1. In this case, the aluminum pools from the three batches amount to 91.3%, 96.6% and 93.7%, respectively, of the scrap metal charged for those batches.

Saltcakes from runs performed by procedures similar to those of Examples 1, 2 and 3 were analyzed by ICAP. The results for selected metals from the analyses are listed in Table I below. The sodium present in the saltcakes represents residual sodium chloride left in the furnace from previous runs in which sodium chloride was used as the flux. It will be noted that the sodium level listed in the Table decreases from a high level in the UBC reclamation, which was the first run made with a 100% KCl flux, to the Class III reclamation, which was the last of the three. This reflects a cleaning of the furnace rather than an indication of any sodium in the reclamation process.

TABLE I

| | ICAP Scan Analysis of Saltcakes (Selected Metals, ppm) | | |
|---|---|---|---|
| Metal | UBC 1st Run | Class I 2d Run | Class III 3d Run |
| Aluminum | 165,000 | 104,000 | 115,000 |
| Barium | 428 | 12.6 | 12.3 |
| Calcium | 1,600 | 304 | 292 |
| Copper | 301 | 55 | 59 |
| Iron | 2,250 | 499 | 499 |
| Magnesium | 59,600 | 37,800 | 36,900 |
| Manganese | 1,530 | 394 | 456 |
| Potassium | 22,900 | 112,000 | 107,000 |
| Sodium | 28,900 | 5,950 | 5,840 |
| Titanium | 2,650 | 156 | 174 |

This data, combined with the aluminum recovery data in Examples 1, 2, and 3 indicates that KCl functions effectively as a flux in the absence of NaCl.

EXAMPLE 4

The water solubilities of the saltcake components were determined over a range of pH as an indication of the behavior of the saltcake as a fertilizer in soil. The saltcake analyzed was a representative sample from the reclamation processed described in Examples 1, 2 and 3, at a size range of 0.15–3 mm.

To determine water solubility, the samples were added to deionized water adjusted to a selected pH level ranging from 0.6 to 5.6. The proportions used were 50 mL of the pH-adjusted water to 1 g of the granulated saltcake, shaken on a rotary shaker at 170 rpm for sixteen hours, and filtered through a 2$\mu$ millipore filter. The final pH was taken on the resulting filtrate. To determine total concentrations of each component in the saltcake, additional samples were digested with $HNO_3$ and $HClO_4$.

Analyses of potassium and sodium were performed by atomic emission spectrometry, while analyses of aluminum and magnesium were performed by atomic absorption spectrometry. The total concentrations in the sample are listed in Table II below, together with the pH of the filtrate obtained by exposing the sample to deionized water and filtering according to the procedure described above.

TABLE II

| Levels of Four Metals in Saltcake | |
|---|---|
| Metal | Weight Percent |
| K | 19.0 |
| Al | 12.0 |

TABLE II-continued

Levels of Four Metals in Saltcake

| Metal | Weight Percent |
|---|---|
| Na | 3.4 |
| Mg | 2.4 |
| pH | 9.3 |

The levels of these four metals in the filtrates, which are indications of the water solubility at the various pH levels, are listed in Table III below.

TABLE III

Water Solubility of Metals
As Percent of Total Content of Metal vs. pH

| pH | K | Na | Al | Mg |
|---|---|---|---|---|
| 0.8 | 101.5 | 98.5 | 43 | 18 |
| 3.8 | 99.5 | 104.5 | 33 | 15 |
| 4.3 | 102 | 101 | 14 | 11 |
| 6.2 | 98 | 98 | 0 | 11 |
| 8.5 | 99 | 99.5 | 0 | 8 |
| 9.0 | 97 | 99.5 | 0.1 | 3 |
| 9.3 | 98 | 104 | 0.3 | 1 |
| 9.4 | 98.5 | 99.5 | 0.4 | 0.5 |

The data in this table indicate that the solubilities of sodium and potassium are independent of pH, and that the sodium and potassium salts are totally water soluble over the entire range of pH, the variations merely representing the margin of error. Unlike sodium and potassium, the solubility of aluminum and magnesium was dependent on pH, an increase in solubility occurring with a decrease in pH. Under even the most highly acidic conditions (pH=0.8), however, the magnesium solubility reached only 18% of the total magnesium content, and the aluminum solubility reached only 43%.

This solubility data indicates that the material is favorable for use as a soil fertilizer. The entire potassium content is soluble and therefore available for plant uptake, whereas the aluminum is of such low solubility that it raises little if any danger of phytotoxicity.

EXAMPLE 5

This example illustrates the use of saltcake obtained in accordance with the present invention as a soil fertilizer. Spring wheat was used as a test crop, and the tests compared the saltcake to conventional 0-0-60 grade potash fertilizer. Included among the measurements taken were potassium availability to the wheat, aluminum phytotoxicity and trace metal uptake. As demonstrated and explained in detail below and shown in Tables IV through X, the results were highly favorable. In these tables, the screened saltcake sample is referred to as "By-product."

The saltcake sample used in these tests was screened to 0.15-3 mm size, and analyzed for elemental content in the liquid phase by digestion in $HNO_3$ and $HClO_4$. Solid phase analyses were conducted using a Scintag PADV x-ray diffraction system, and both solid and liquid phases were analyzed on a Nikon Optophot polarized optical microscope.

The soil used in these tests was Wynneville silt loam soil limed to pH 6.5 and 7.6 by adding 0.8 and 3 g lime per kg of soil, respectively. The lime used was a 4:1 $CaCO_3:MgCO_3$ mixture applied to 200 kg soil for each pH. After lime application, the soil was wet to field capacity, allowed to set for one week, then placed in pots with 8 kg soil per pot. Nitrogen and phosphorus were applied to the soil in each pot as $NH_4NO_3$ and superphosphate (TSP), respectively, at rates of 225 mg/kg for N and 250 mg/kg for P. Micronutrients were supplied as a sulfate and borate salt mixture at rates of 4.7 mg Mg, 4.7 mg Fe, 3.7 mg Mn, 4.3 mg Zn, 1.2 mg Cu, 0.5 mg B, and 12.7 mg S per kg of soil. Since the soil already contained a considerable amount of potassium, corn was grown in the soil to mine the potassium and lower the available soil potassium, thereby increasing the sensitivity of the ensuing experiments. This was achieved by growing two successive corn crops on the soil at eight corn plants per pot for 44 and 34 days, respectively. After the first corn crop, supplemental N was applied as an $NH_4NO_3$ solution to supply 62.5 mg of N per kg of soil.

Quantities of extractable potassium in the soil were determined by extracting the soil with Mehlich I extractant, which contained 0.025N $H_2SO_4$ and 0.05N HCl. This was achieved by adding a 12.5 kg soil sample to 50 mL of Mehlich extractant, shaking the mixture on a rotary mixer for 5 minutes, then filtering. The potassium in the filtrate was analyzed by atomic emission spectroscopy. The amount of extractable potassium in the soil determined in this manner was 63 mg/kg and 68 mg/kg at soil pH's of 6.5 and 7.6, respectively, before growing corn. After the first corn crop, the extractable potassium decreased to 11 mg/kg and 22 mg/kg, respectively, while the soil pH decreased to 5.6 and 7.4, respectively. After the second corn crop, the values decreased further, to 5 mg/kg and 15 mg/kg, and pH 5.5 and 7.2, respectively.

Following the growing of the corn crops, the soil was removed from the pots and homogenized for each soil pH. For the wheat studies to follow, 1 kg of soil was mixed with 0.75 g of sand for each pot. The sand was included to minimize the available K and to maximize the volume of the growing medium. The nutrients N, P and S were added to the pots at rates of 280 mg/pot for N (added in the form of $NH_4NO_3$), 120 mg/pot for P (added in the form of TSP), and 23.6 mg/pot for S (added in the form of $CaSO_4$.

The comminuted saltcake referred to above was added to some of the pots as a K source, while 0-0-60 grade (oxide basis, $K_2O$) potash fertilizer was added to others. The latter contained 52.3% K as determined by acid digestion and atomic emission spectroscopy. The contents of the soil mixture in each pot were thoroughly mixed, and a control to which neither potassium source had been added was prepared in an identical manner.

In each pot were planted fifteen seeds of Thatcher spring wheat, at a depth of 0.5 inch. After 6 days, the plants were thinned to 8 plants per pot. The plants were grown under high intensity growth lamps, and water was added as needed to maintain a water level in each pot of 230 g per kg of dry soil. The maximum daily temperatures ranged from 75° F. to 85° F., and the minimum daily temperatures from 65° F. to 70° F.

The above-ground portions of the plants were harvested 42 days after planting. The roots were collected by separating the roots from the soil and washing them in 0.05M $HNO_3$. The above-ground and root portions were dried in a forced-air oven, weighed and ground for chemical analyses. The soil was air-dried, screened through 2 cm screens, and stored in polyethylene containers until chemical analyses were performed.

The above-ground and root portions of the wheat plants were digested by dry ashing for 6 hours at 475° C., dissolving in 2N $HNO_3$, and filtering. Filtrate from the above-ground portions were analyzed for K, Al, P, Ca, Mg, Ti, Fe, Zn, Pb, Cu, Ni and Cr, while filtrates from the root portions were analyzed for K and Al. Methods of analysis included atomic emission spectroscopy for K and Ti, colorimetry for P, atomic absorption spectroscopy for Al, Ca, Mg, Fe, Zn, Pb, Cu, Ni and Cr, and a Kjeldahl method (with salicylic acid-thiosulfate modification) for total N. Plant uptake of nutrients or trace metals was calculated by multiplying dry matter weight of plant root or above-ground portions by the concentration of nutrients or trace metals in the plant portions.

In addition to the Mehlich I method for determining extractable K in the soil, K extractable alternately by 0.01M $CaCl_2$ and 1M KCl was also measured. The $CaCl_2$ method indicates Al available to the plants, whereas the KCl method indicates exchangeable Al. For the $CaCl_2$ method, 20 mL of the $CaCl_2$ solution was added to 10 g of the soil, shaken for five minutes, then filtered. For the KCl method, 50 mL of the KCl solution was added to 5 g of the soil, shaken for thirty minutes, then filtered. Aluminum was determined in the filtrates by a colorimetric method using 8-hydroxyquinoline.

The composition of the saltcake is listed in Table IV, and the results of various experiments are shown in Tables V through X.

Table V indicates that the N, Ca and Mg uptake by wheat in the above-ground plant portions was not affected by either soil pH, the rate of application of the K, or the source of the K.

Table VI indicates that the uptake of K by the above-ground and root portions of the wheat was also the same regardless of the K source, as was the Mehlich I extractable K in the soil. While a difference appears in terms of the relationship between the Mehlich I extractable K and the soil pH between the two K sources, the K availability in terms of the K uptake and Mehlich I soil K were similar.

The aluminum uptake study shown in Table VII indicates that there was essentially no difference between the two K sources, indicating no bioavailability of Al from the saltcake. This is also true of the extractable Al in the soil.

The trace metal uptake was also measured, with results shown in Table VIII. Here again, no significant difference is seen between the two K sources.

To investigate potential hazards from high soil application rates or continual and repeated applications over time, tests were run with a high K application rate of 750 mg/pot. The results are shown in Tables IX and X. The data in Table IX indicates that there was no difference in root dry matter weight, or in K and Al uptake rates in the above-ground and root portions, between the two K sources. The same is true of the trace metal uptake as indicated in Table X, particularly at pH 7.2.

On the whole, the data clearly indicates that the use of aluminum reclamation by-product as a potassium fertilizer is acceptable from an agronomic viewpoint. The potassium in the by-product and the potassium in conventional 0-0-60 fertilizer are equally water-soluble and bioavailable, and there is no evidence of increased bioavailability of Al from the by-product despite the fact that the by-product contains 12% Al. Nor is there any evidence of increased trace metal availability.

TABLE IV

Aluminum Reclamation By-Product Used in Bioavailability Studies - Chemical Analysis

| Element | % | Element | mg/kg |
|---|---|---|---|
| K | 19.0 | Ti | 543 |
| Al | 12.0 | P | 438 |
| Cl | 16.6 | Cr | 198 |
| Mg | 2.4 | Cu | 146 |
| Na | 3.3 | S | 122 |
| Si | 1.5 | Zn | 64 |
| total N | 0.35 | Ba | 47 |
| N as $NH_4$ | 0.04 | Pb | 39 |
| Ca | 0.27 | Ni | 16 |
| Fe | 0.24 | Cd | <3 |
| F | 0.26 | As | <13 |
| Mn | 0.10 | | |

TABLE V

Nutrient Uptake in Wheat

| Initial Soil pH | K Source | N | P | Ca | Mg |
|---|---|---|---|---|---|
| | | (----------mg/pot*----------) | | | |
| 5.5 | By-product | 188 | 21.7 | 81.5 | 12.7 |
| | 0-0-60 | 182 | 21.3 | 86.2 | 12.5 |
| 7.2 | By-product | 158 | 16.3 | 85.2 | 15.3 |
| | 0-0-60 | 161 | 16.1 | 90.5 | 15.8 |

*Averaged over soil K application rates ranging from 30 to 150 mg/pot.

TABLE VI

Potassium Uptake in Wheat

| Initial Soil pH | K Source | K Rate | K Wheat Uptake above-ground | root | Mehlich I soil K (mg/kg) |
|---|---|---|---|---|---|
| | | (----------mg/pot----------) | | | |
| 5.5 | | 0 | 14.1 | 0.5 | 14.0 |
| 5.5 | By-product | 30 | 31.5 | 1.3 | 17.2 |
| | | 60 | 42.6 | 1.3 | 21.9 |
| | | 90 | 54.7 | 2.4 | 26.3 |
| | | 120 | 61.9 | 3.0 | 28.2 |
| | | 150 | 82.0 | 5.0 | 32.2 |
| | | (avg) | 54.5 | 2.6 | 25.2 |
| 5.5 | 0-0-60 | 30 | 30.3 | 0.9 | 13.7 |
| | | 60 | 41.1 | 2.8 | 17.8 |
| | | 90 | 47.1 | 2.7 | 22.9 |
| | | 120 | 71.8 | 4.2 | 24.5 |
| | | 150 | 75.5 | 4.9 | 27.7 |
| | | (avg) | 53.2 | 3.1 | 21.3 |
| 7.2 | By-product | 0 | 14.9 | 0.3 | 12.7 |
| 7.2 | | 30 | 30.1 | 0.9 | 16.2 |
| | | 60 | 42.6 | 1.2 | 19.7 |
| | | 90 | 59.4 | 2.0 | 21.9 |
| | | 120 | 82.8 | 2.3 | 26.3 |
| | | 150 | 101 | 3.5 | 30.6 |
| | | (avg) | 63.2 | 2.0 | 22.9 |
| 7.2 | 0-0-60 | 30 | 26.3 | 1.0 | 16.5 |
| | | 60 | 44.8 | 2.2 | 21.7 |
| | | 90 | 60.7 | 1.7 | 27.0 |
| | | 120 | 77.5 | 2.9 | 28.8 |
| | | 150 | 89.8 | 2.7 | 33.1 |
| | | (avg) | 59.8 | 2.1 | 33.1 |

TABLE VII

Aluminum Uptake in Wheat and Soil-Extractable Aluminum

| Initial soil pH | K source | K rate | Al in Wheat above-ground | root | Al in Soil (a) | (b) | Soil pH |
|---|---|---|---|---|---|---|---|
| | | (------mg/pot------) | | | (--mg/kg--) | | |
| 5.5 | | 0 | 0.5 | 2.2 | 0.80 | 5.77 | 5.3 |
| 5.5 | By-product | 30 | 0.2 | 5.7 | 0.68 | 4.63 | 5.6 |
| | | 60 | 0.4 | 6.1 | 0.57 | 3.79 | 5.8 |
| | | 90 | 0.3 | 10.9 | 0.75 | 3.66 | 5.6 |
| | | 120 | 0.2 | 12.5 | 0.85 | 5.75 | 5.6 |

TABLE VII-continued

Aluminum Uptake in Wheat and Soil-Extractable Aluminum

| Initial soil pH | K source | K rate (mg/pot) | Al in Wheat above-ground | Al in Wheat root | Al in Soil (a) (-mg/kg-) | Al in Soil (b) | Soil pH |
|---|---|---|---|---|---|---|---|
| | | 150 | 0.3 | 14.1 | 0.66 | 3.73 | 5.6 |
| | | (avg) | 0.3 | 9.9 | 0.70 | 4.31 | 5.6 |
| 5.5 | 0-0-60 | 30 | 0.2 | 4.6 | 0.77 | 4.14 | 5.7 |
| | | 60 | 0.4 | 8.9 | 0.58 | 3.06 | 5.7 |
| | | 90 | 0.3 | 9.3 | 0.49 | 2.99 | 5.8 |
| | | 120 | 0.3 | 10.8 | 0.57 | 3.05 | 5.6 |
| | | 150 | 0.4 | 11.5 | 0.65 | 4.19 | 5.6 |
| | | (avg) | 0.3 | 9.0 | 0.61 | 3.48 | 5.7 |
| 7.2 | | 0 | 0.1 | 2.1 | N/D | 0.35 | 6.6 |
| 7.2 | By-product | 30 | 0.2 | 4.1 | N/D | 0.35 | 7.1 |
| | | 60 | 0.2 | 4.6 | N/D | 0.35 | 7.2 |
| | | 90 | 0.2 | 3.7 | N/D | 0.66 | 7.2 |
| | | 120 | 0.2 | 7.2 | N/D | 0.68 | 7.2 |
| | | 150 | 0.3 | 10.7 | N/D | 0.54 | 7.0 |
| | | (avg) | 0.2 | 6.1 | | 0.52 | 7.1 |
| 7.2 | 0-0-60 | 30 | 0.2 | 4.2 | N/D | 0.35 | 7.1 |
| | | 60 | 0.2 | 4.9 | N/D | 0.59 | 7.1 |
| | | 90 | 0.3 | 5.0 | N/D | 0.39 | 7.2 |
| | | 120 | 0.3 | 11.2 | N/D | 0.59 | 7.0 |
| | | 150 | 0.2 | 5.4 | N/D | 0.47 | 7.0 |
| | | (avg) | 0.2 | 6.1 | | 0.48 | 7.1 |

(a) Al extractable from soil by 0.01 M CaCl$_2$
(b) Al extractable from soil by 1 M KCl
N/D: Values below detection limit of 0.27 mg/kg

TABLE VIII

Trace Metal Uptake in Wheat (Above-Ground Portions)

| Initial soil pH | K source | K rate (-mg/pot-) | Ti | Fe | Zn | Pb | Cu | Ni |
|---|---|---|---|---|---|---|---|---|
| | | | | | (—μg/pot—) | | | |
| 5.5 | | 0 | 19 | 952 | 102 | 7 | 11 | N/D |
| 5.5 | By-product | 30 | 36 | 456 | 139 | 11 | 16 | N/D |
| | | 60 | 33 | 549 | 142 | 14 | 19 | N/D |
| | | 90 | 32 | 613 | 133 | 16 | 30 | N/D |
| | | 120 | 19 | 459 | 121 | 13 | 35 | N/D |
| | | 150 | 26 | 549 | 141 | 16 | 20 | N/D |
| | | (avg) | 29 | 525 | 135 | 14 | 24 | |
| 5.5 | 0-0-60 | 30 | 29 | 440 | 151 | 12 | N/D | N/D |
| | | 60 | 30 | 643 | 133 | 15 | N/D | N/D |
| | | 90 | 28 | 549 | 117 | N/D | N/D | N/D |
| | | 120 | 26 | 544 | 136 | N/D | N/D | N/D |
| | | 150 | 22 | 612 | 114 | 17 | N/D | N/D |
| | | (avg) | 27 | 558 | 130 | 15 | | |
| 7.2 | | 0 | 15 | 196 | 42 | 7 | 13 | 28 |
| 7.2 | By-product | 30 | 27 | 369 | 51 | 12 | 20 | 30 |
| | | 60 | 26 | 364 | 42 | 12 | 22 | N/D |
| | | 90 | 24 | 399 | 43 | 13 | 23 | 81 |
| | | 120 | 31 | 437 | 59 | 17 | 47 | 102 |
| | | 150 | 32 | 579 | 64 | 21 | 51 | 102 |
| | | (avg) | 28 | 430 | 52 | 15 | 33 | 86 |
| 7.2 | 0-0-60 | 30 | 27 | 363 | 44 | 11 | 29 | 55 |
| | | 60 | 30 | 381 | 45 | 17 | 33 | 70 |
| | | 90 | 37 | 453 | 44 | 15 | 34 | 78 |
| | | 120 | 34 | 508 | 63 | 20 | 48 | 117 |
| | | 150 | 28 | 465 | 54 | 17 | 46 | 95 |
| | | (avg) | 31 | 434 | 50 | 16 | 38 | 83 |

N/D: Values below detection limits of 2 mg Pb, 3 mg Cu, and 5 mg Ni, all per kg of plant tissue.

TABLE IX

High K Application Rate (750 mg/pot) - Effect on Wheat Dry Matter Uptake, Elemental Uptake and Soil Parameters

| Initial soil pH | K source | Wheat Dry Matter Weight above-ground | root |
|---|---|---|---|
| | | (———g/pot———) | |
| 5.5 | By-product | 8.03 | 3.76 |
| | 0-0-60 | 7.73 | 3.80 |
| 7.2 | By-product | 8.26 | 4.34 |
| | 0-0-60 | 7.40 | 3.64 |

| Initial soil pH | K source | Elemental Uptake in Wheat above-ground K | Al | N | P | Ca | Mg | root K | Al |
|---|---|---|---|---|---|---|---|---|---|
| | | (—————————mg/pot—————————) | | | | | | | |
| 5.5 | By-product | 280 | 0.5 | 218 | 22 | 69 | 9 | 7.8 | 12.7 |
| | 0-0-60 | 248 | 0.4 | 191 | 22 | 81 | 9 | 7.8 | 12.7 |
| 7.2 | By-product | 216 | 0.2 | 186 | 22 | 86 | 12 | 5.5 | 12.2 |
| | 0-0-60 | 220 | 0.4 | 182 | 22 | 101 | 15 | 10.2 | 9.8 |

| Initial soil pH | K source | Soil Measurements Mehlich K | pH | Soil Al (a) | Soil Al (b) |
|---|---|---|---|---|---|
| | | | (———mg/kg———) | | |
| 5.5 | By-product | 5.5 | 212 | 0.44 | 2.24 |
| | 0-0-60 | 5.4 | 187 | 0.66 | 4.23 |
| 7.2 | By-product | 7.0 | 211 | N/D | 0.52 |
| | 0-0-60 | 7.0 | 232 | N/D | 0.36 |

(a): Al extractable from soil by 0.01 M CaCl$_2$
(b): Al extractable from soil by 1 M KCl
N/D: Values below detection limit of 0.27 mg/kg

TABLE X

High K Application Rate (750 mg/pot) - Effect on Trace Metal Uptake in Wheat (Above-Ground Portions)

| Initial soil pH | K source | Ti (mg/pot) | Fe | Zn | Pb | Cu | Ni |
|---|---|---|---|---|---|---|---|
| | | | (————μg/pot————) | | | | |
| 5.5 | By-product | 26 | 859 | 216 | 24 | 46 | 128 |
| | 0-0-60 | 25 | 749 | 177 | 18 | 37 | 80 |
| 7.2 | By-product | 29 | 660 | 78 | 19 | 75 | 123 |
| | 0-0-60 | 33 | 646 | 78 | 21 | 68 | 111 |

Aluminum reclamation dross derived from KCl flux in accordance with this invention, such as that addressed by the examples above, may be further processed in any of a variety of ways to place it in a form suitable for use as a fertilizer. The material can be used in a variety of solid fertilizer forms, and the means by which the material is processed, the particle size, the presence and amount of additional ingredients, and other variables which may be encountered in the final preparation prior to soil application will vary with the particular means of application and the crop, type of field or location to which the application will be made.

For most applications, the dross will first be comminuted to particles, generally of about 10 mm diameter or smaller, and preferably about 5 mm or smaller, depending on the ultimate formulation. Among the various types of formulations which the dross may ultimately assume for fertilizer use are suspensions, powders, granules and pellets.

For further formulation of the dross for use as a fertilizer, the dross may be combined with additives to facilitate its distribution and otherwise modify its physical properties. Examples of such additives are carriers, diluents, anti-caking agents, and conditioners of various kinds. These may include clays, gels, diatomaceous earth, vermiculite, wetting agents, humectants, organic matter such as comminuted corn cobs, and a many other such additives known for their use in fertilizer formulations. The dross may further be supplemented with additional nutrients to achieve desired combinations of different types of nutrients.

Once the dross is formulated as a fertilizer, it may be applied to the soil in the conventional manner. Application methods include airplane application and application at the ground level, using such techniques as dusting, spraying, discing, dragging or mixing, or adding the formulation to irrigation water.

The foregoing is offered primarily for purposes of illustration. It will be readily apparent to those skilled in the art that the operating conditions, materials, procedural steps and other parameters described herein may be further modified or substituted in various ways without departing from the spirit and scope of the invention.

what is claimed is:

1. A method of fertilizing soil comprising applying to said soil a potassium-containing mixture formed by a process consisting essentially of:
   (a) contacting aluminum-bearing waste material with a molten flux having a salt content of at least about 90% potassium chloride, at a temperature of from about 1300° F. to about 1500° F., to cause aluminum from said aluminum-bearing waste material to separate into a molten aluminum phase substantially free of species other than metallic aluminum, leaving a salt phase containing species from said aluminum-bearing waste material other than metallic aluminum; and
   (b) recovering said salt phase as a solid residue free of said molten aluminum phase.

2. A method in accordance with claim 1 in which said potassium chloride comprises at least about 95% by weight of the salt content of said molten flux.

3. A method in accordance with claim 1 in which said molten flux is substantially entirely composed of potassium chloride.

4. A method in accordance with claim 1 in which said aluminum-bearing waste material contains nitrogen-containing impurities.

5. A method in accordance with claim 1 in which said aluminum-bearing waste material contains aluminum nitride.

6. A method in accordance with claim 1 in which said aluminum-bearing waste material is a member selected from the group consisting of scrap aluminum from aluminum beverage cans, Class I aluminum waste and Class III aluminum waste.

7. A method in accordance with claim 1 in which steps (a) and (b) are conducted in the absence of phosphoric acid.

8. A method of manufacturing a soil fertilizer from aluminum-bearing waste material, said method consisting essentially of:
   (a) contacting said aluminum-bearing waste material with a molten flux having a salt content of at least about 90% potassium chloride, at a temperature of from about 1300° F. to about 1500° F., to cause aluminum from said aluminum-bearing waste material to separate into a molten aluminum phase substantially free of species other than metallic aluminum, leaving a salt phase containing species from said aluminum-bearing waste material other than metallic aluminum;
   (b) recovering said salt phase as a solid residue free of said molten aluminum phase; and
   (c) comminuting said salt phase to a particle size of about 10 mm or less suitable for application to soil as a fertilizer.

9. A method in accordance with claim 8 in which said potassium chloride comprises at least about 95% by weight of the salt content of said molten flux.

10. A method in accordance with claim 8 in which said molten flux is substantially entirely composed of potassium chloride.

11. A method in accordance with claim 8 in which said aluminum-bearing waste material contains nitrogen-containing impurities.

12. A method in accordance with claim 8 in which said aluminum-bearing waste material contains aluminum nitride.

13. A method in accordance with claim 8 in which said aluminum-bearing waste material is a member selected from the group consisting of scrap aluminum from aluminum beverage cans, Class I aluminum waste and Class III aluminum waste.

14. A method in accordance with claim 8 in which steps (a), (b) and (c) are conducted in the absence of phosphoric acid.

15. A soil fertilizer comprising a potassium-containing mixture formed by a process consisting essentially of:
   (a) contacting aluminum-bearing waste material with a molten flux having a salt content of at least about 90% potassium chloride, at a temperature of from about 1300° F. to about 1500° F., to cause aluminum from said aluminum-bearing waste material to separate into a molten aluminum phase substantially free of species other than metallic aluminum, leaving a salt phase containing species from said aluminum-bearing waste material other than metallic aluminum; and
   (b) recovering said salt phase as a solid residue free of said molten aluminum phase.

16. A soil fertilizer in accordance with claim 15 in which said potassium chloride comprises at least about 95% by weight of the salt content of said molten flux.

17. A soil fertilizer in accordance with claim 15 in which said molten flux is substantially entirely composed of potassium chloride.

18. A soil fertilizer in accordance with claim 15 in which said aluminum-bearing waste material contains nitrogen-containing impurities.

19. A soil fertilizer in accordance with claim 15 in which said aluminum-bearing waste material contains aluminum nitride.

20. A soil fertilizer in accordance with claim 15 in which said aluminum-bearing waste material is a member selected from the group consisting of scrap aluminum from aluminum beverage cans, Class I aluminum waste and Class III aluminum waste.

21. A soil fertilizer in accordance with claim 15 in which steps (a) and (b) are conducted in the absence of phosphoric acid.

22. A method of fertilizing soil comprising applying to said soil a potassium-containing mixture formed by a process consisting of:
   (a) contacting aluminum-bearing waste material with a molten flux having a salt content of at least about 90% potassium chloride, at a temperature of from about 1300° F. to about 1500° F., to cause aluminum from said aluminum-bearing waste material to separate into a molten aluminum phase substantially free of species other than metallic aluminum, leaving a salt phase containing species from said aluminum-bearing waste material other than metallic aluminum; and (b) recovering said salt phase as a solid residue free of said molten aluminum phase.

23. A soil fertilizer comprising a potassium-containing mixture formed by a process consisting of:
(a) contacting aluminum-bearing waste material with a molten flux having a salt content of at least about 90% potassium chloride, at a temperature of from about 1300° F. to about 1500° F., to cause aluminum from said aluminum-bearing waste material to separate into a molten aluminum phase substantially free of species other than metallic aluminum, leaving a salt phase containing species from said aluminum-bearing waste material other than metallic aluminum; and
(b) recovering said salt phase as a solid residue free of said molten aluminum phase;

steps (a) and (b) having been conducted in the absence of phosphoric acid.

* * * * *